Dec. 7, 1965  D. R. CHICK  3,222,608

CONTROLLED SIGNAL INVERTER

Filed July 12, 1963

INVENTOR,
DONALD R. CHICK
BY *Edward Kelly*
ATTORNEY.

+ # United States Patent Office 3,222,608
Patented Dec. 7, 1965

3,222,608
CONTROLLED SIGNAL INVERTER
Donald R. Chick, Dallas, Tex., assignor to the United States of America as represented by the Secretary of the Army
Filed July 12, 1963, Ser. No. 294,779
7 Claims. (Cl. 330—14)

The present invention relates to a controlled signal inverter and more particularly to a device for providing at an output either a negative replica or a positive replica of an input signal depending on the state of a control signal.

This invention may find particular use in the field of airborne side-looking radar which alternately scans the terrain from the sides of the aircraft. If the aircraft carrying the radar is rolled off the horizontal, the paths for the transmitted and reflected pulses will have been lengthened and shortened on the alternate sides of the aircraft. Therefore, more amplification will be needed in the radar receiver for pulses received on the rolled "up" side and less amplification will be needed for pulses received on the rolled "down" side. As the radar beams sweep out from the sides of the aircraft the amplification must be increased or decreased in a linear or sawtooth manner.

In such a system a sawtooth generator is provided for producing a sawtooth signal the amplitude of which is proportional to the amount of roll from horizontal flight. A control signal—of the pulse, no pulse type— is also produced in the system which represents the direction of roll from the horizontal. The device of the present invention will receive this sawtooth signal and the control signal at its input, and will then provide a similar sawtooth signal at its output, the polarity of which depends on the state of the control signal. This sawtooth output is then used to control the grid of a tube such that the gain of the receiver is either decreased or increased according to the amplification desired.

Of course the present signal inverter may find use in numerous other systems where the polarity of a signal must be varied with the state of a control signal. However, since the device will find particular use in an airborne system, the size, weight, and power consumptions are of prime importance.

It is therefore the object of this invention to provide a small, lightweight, and economical device for selectively inverting or not inverting an input signal, depending on the state of a control signal.

Figure 1:
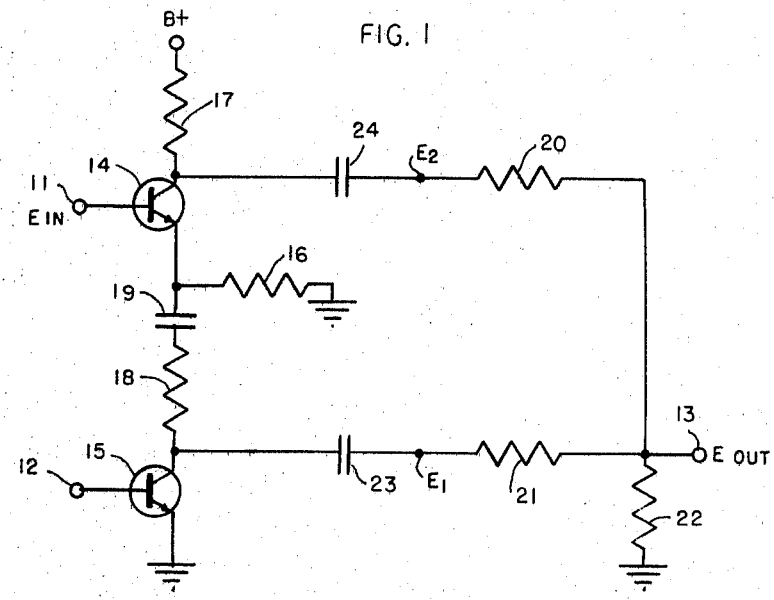
Figure 2:
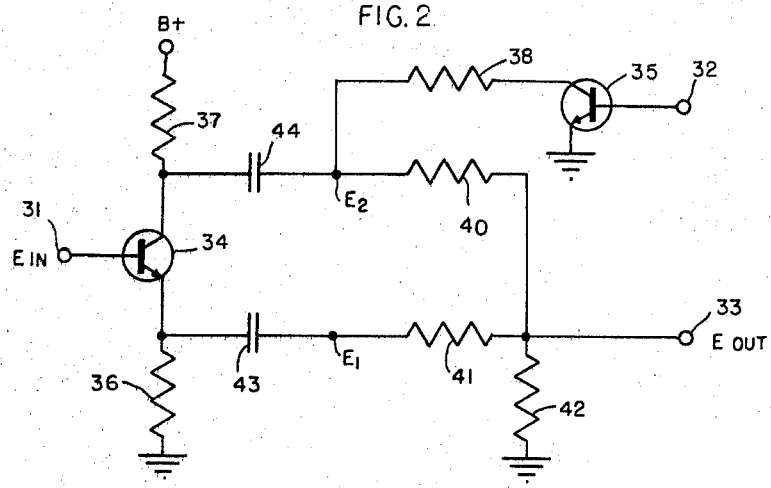

With this and other objects in view, as will hereinafter more fully appear, and which will be more particularly pointed out in the appended claims, reference is now made to the following description taken in connection with the accompanying drawings in which:

FIG. 1 shows a diagrammatic view of one form of the invention;
FIG. 2 shows a diagrammatic view of a modified form of the invention.

Referring now to FIG. 1 there is shown a controlled signal inverter having input terminals 11 and 12 and an output terminal 13. Terminal 11 is connected directly to the base electrode of a first NPN transistor 14 which, in this case, acts as a polarity splitter. Terminal 12 is connected to the base electrode of a second NPN transistor 15 which, in this case, acts as a switching device. Of course, PNP transistors may also be used by merely changing the bias on the transistors in the well known manner. The emitter electrode of transistor 14 is connected to an emitter resistor 16 which is grounded. A collector resistor 17 connects the collector electrode of transistor 14 to a B+ voltage.

The collector of transistor 15 is coupled to the emitter of transistor 14 by a capacitor 19 and a resistor 18. The emitter of transistor 15 is connected to ground.

An adding network, comprising resistors 20, 21 and 22, is coupled by capacitors 23 and 24 to the collectors of transistors 14 and 15 respectively. Two terminals, $E_1$ and $E_2$, are formed which represent the outputs of the polarity splitter transistor 14. These terminals act as the inputs to the adding network. The output terminal 13 is connected across resistor 22 which in turn is connected to ground.

The device of FIG. 2, which operates in a similar manner as the device of FIG. 1, comprises input terminals 31, 32, and output terminal 33. Terminal 31 is connected directly to the base of NPN transistor 34 which, in this circuit, acts as the polarity splitter. An emitter bias resistor 36 connects the emitter of transistor 34 to ground while a collector resistor 37 connects the collector of transistor 34 to a B+ voltage. An adding network, comprising resistors 40, 41 and 42, is coupled by capacitors 43 and 44 to the emitter and collector respectively of transistor 34 to form two terminals $E_1$ and $E_2$ which represent the outputs of the polarity splitter. These terminals $E_1$ and $E_2$ are the inputs to the adding network. The output terminal 33 is connected across resistor 42 which in turn is connected to ground. A second transistor 35, used as a switching device, has input terminal 32 connected to its base electrode while its emitter electrode is grounded. A collector resistor 38 connects the collector electrode of transistor 35 to the terminal $E_2$.

The operation of the device of FIG. 1 will now be described. With no control signal present at terminal 12, transistor 15 is cut off. Transistor 14 is normally conducting with current flow from ground through resistor 16, the emitter electrode, the base electrode, the collector electrode, and resistor 17 to the B+ voltage. If a positive going signal, such as a sawtooth, is applied to terminal 11, the current through transistor 14 will increase thereby increasing the current through resistor 16. Since transistor 15 is cut off and assuming resistors 20, 21, and 22 to be much larger than resistor 18, virtually all of the increase in voltage drop across resistor 16, due to the increase in current, will also appear across transistor 15 and resistors 21 and 22. Therefore, as the voltage at terminal 11 increases, the voltage at terminal $E_1$ will also increase. The elements of the circuit could be designed such that the voltage at $E_1$ is substantially equal to the applied voltage at terminal 11.

The voltage at terminal $E_2$ will depend on the gain of transistor 14. The gain of a transistor amplifier with an un-bypassed emitter resistor is substantially equal to the ratio of the load resistance to the emitter resistance. The emitter resistance of transistor 14, when transistor 15 is cut off, is substantially equal to the resistance of resistor 16 since the cutoff resistance of transistor 15 and the resistance of resistors 21 and 22 are so large that they may be neglected. The load resistance, likewise, is equal to the resistance of collector resistor 17. Therefore, the voltage at $E_2$ will be equal to the voltage of the signal applied to terminal 11, times the ratio of the resistance of resistor 17 to the resistance of resistor 16. The voltage at $E_2$ will have a polarity which is opposite to that of the applied voltage. For example, when the voltage at terminal 11 goes positive, the resultant increase in current through the resistor 17 will cause a larger drop in voltage across the resistor 17 thereby causing a negative voltage to appear at $E_2$. Therefore, transistor 14 acts as a polarity splitter for providing from an input wave at terminal 11 two waves $E_1$ and $E_2$ which are opposite in polarity from one another and which are each replicas of the in put wave. These two waves, $E_1$ and $E_2$, are then added by the network containing resistors 20, 21 and 22 to provide an output which will also be a replica of the input and will be of the same polarity as the most intense of the two waves appearing at $E_1$ and $E_2$. If we assume a gain for transistor 14 of less than unity and, as stated previously, if the signal at $E_1$ is made to follow the input signal, then the signal at $E_1$ will be the more intense signal thereby causing the output to have the same polarity at the signal at $E_1$ which in turn has the same polarity as the input signal.

Therefore, with transistor 15 cut off, i.e., with no control signal applied to terminal 12, the output at terminal 13 will be an uninverted replica of the input signal at terminal 11.

To provide an inverted replica of the input signal, it will now be necessary to reverse the relative intensities of the signals appearing at $E_1$ and $E_2$. This is accomplished by applying a control signal to transistor 15 which, for example, could saturate the transistor. When this is done the equivalent emitter resistance of transistor 14 is changed thereby changing the gain of this transistor and the intensity of the signal at $E_2$. The intensity of the signal at $E_1$ is also changed since the voltage at $E_1$ will depend on the voltage division created by the saturation resistance of transistor 15. The gain will be increased to increase the voltage at $E_2$ while the voltage at $E_1$ will be decreased. The result is that the intensity of the signal at $E_2$ is now larger than the intensity of the signal at $E_1$ thereby causing the output signal at terminal 13 to have the same polarity as the signal at $E_2$ which in turn is of opposite polarity to the input signal.

This may be better illustrated with a typical example. Assume the gain of transistor 14 to be .1, i.e., $R_{17}/R_{16}=.1$. The voltage at $E_2$ will then be equal to $-.1E_{in}$ (the negative sign indicating the phase or polarity change). $E_1$ may be assumed to be equal to $E_{in}$. If resistors 20, 21 and 22 are all equal, then this adding network will combine the signals at $E_1$ and $E_2$ such that $E_{out}=\frac{1}{3}(E_1+E_2)$, or $E_{out}=\frac{1}{3}(E_{in}-.1E_{in})=\frac{1}{3}(.9E_{in})$. It can therefore be seen that the signal at terminal 13 ($E_{out}$) will follow along with the input signal ($E_{in}$) and will have the same polarity. The value of the signal $E_{out}$ will, in this example, be equal to $.3E_{in}$.

The polarity of this output will be changed when a control signal is applied to terminal 12. Let it be assumed that the resistance of resistor 18 ($R_{18}$) is equal to nine times the saturation resistance of transistor 15 ($R_{15}$), i.e., $9R_{15}=R_{18}$. Because of the voltage division caused by transistor 15 and resistor 18, the voltage at $E_1$ will now be $.1E_{in}$.

The voltage at $E_2$ will, as before, be dependent on the gain of transistor 14. Since elements 18 and 15 are now in parallel with resistor 16 and, since the resistance of transistor 15 is no longer large, the equivalent emitter resistance of transistor 14 will be a combination of those elements added in parallel. This will result in an emitter resistance of $R_{16}(R_{15}+R_{18})/R_{16}+R_{15}+R_{18}$. Therefore the gain of transistor 14, with transistor 15 saturated, is $R_{17}(R_{16}+R_{15}+R_{18})/R_{16}(R_{15}+R_{18})$. This value for the gain may be made equal to unity, i.e., $R_{17}$ may be made equal to $R_{16}(R_{15}+R_{18})/R_{16}+R_{15}+R_{18}$. If this is done, then $E_2$ will be equal to the negative of $E_{in}$, i.e., $E_{in}=-E_2$.

Since the voltage $E_{out}$ at terminal 13 equals $\frac{1}{3}(E_1+E_2)$ and since $E_1=.1E_{in}$ and $E_2=-E_{in}$ then $E_{out}=\frac{1}{3}(.1E_{in}-E_{in})=\frac{1}{3}(-.9E_{in})=-.3_{in}$ Therefore, as can be seen from the foregoing example, the voltage at terminal 13 will be either $.3E_{in}$ or $-.3E_{in}$ depending on the state of the control singal. The only difference between these two values is the sign indicating a change in polarity. Also, the output signal is directly proportional to the input signal.

Of course, the values and assumptions used in the example are only for purposes of illustration. Resistors 20, 21 and 22 may all be of different values which would result only in a more complicated expression for the constant of proportionality. The analysis would be even more complicated if the relative resistances of the adding network to the transistor network was other than as was assumed. However, in all cases, the principle of operation is the same.

In the modification of FIG. 2, the relative values of the intensity of the signals at $E_1$ and $E_2$ are varied by changing the value of the equivalent collector resistance of transistor 34. When transistor 35 is cut off, the equivalent collector resistance will be equal to the resistance of resistor 37. When a control signal is applied to transistor 35, the equivalent collector resistance will be equal to the combination of resistor 37 and resistor 38 and the "on" resistance of transistor 35 added in parallel. In this modification, however, the signal appearing at $E_1$ will always be equal to the input signal $E_{in}$ regardless of the state of the control signal. In this modification, the switching transistor 35 and resistor 38 are not used as a voltage divider as was the case for the device of FIG. 1. Therefore, the ratio of the saturation resistance of transistor 35 and the resistance of resistor 38 is not critical.

In order to come up with the same results obtained in the example for FIG. 1, i.e., $.3E_{in}$ and $-.3E_{in}$, it will be necessary to choose the resistors 36, 37 and 38 such that the gain of transistor 34 will be changed from .1 to 1.9 when a control signal appears. If this is the case, then $E_2$ will change from $-.1E_{in}$ to $-1.9E_{in}$. The adding network will combine $E_1$ and $E_2$ such that $E_{out}=\frac{1}{3}(E_1+E_2)$ or $E_{out}=\frac{1}{3}(E_{in}-1.9E_{in})=-.3E_{in}$ Therefore, the output signal will change from $.3E_{in}$ to $-.3E_{in}$ with a change in state of the control signal. Only the sign is different in the two expressions showing a change in polarity.

Various modification are contemplated and may obviously be resorted to by those skilled in the art without departing from the spirit and scope of the invention, as hereinafter defined by the appended claims, as only preferred embodiments thereof have been disclosed.

What is claimed is:

1. A controlled signal inverter comprising; a voltage polarity splitter having an input, and two outputs which are of opposite polarity and are each replicas of said input; first means connected to said polarity splitter for making the average absolute intensity of one of said outputs larger than the average absolute intensity of the other of said outputs; a control signal input terminal connected to a switching means; said switching means connected to said polarity splitter and said first means for making the average absolute intensity of said one output smaller than the average absolute intensity of said other output upon the application of a control signal applied to said control signal input terminal; and means connected to said outputs for combining said output signals to form an output which is directly proportional to their algebraic sum and is a replica of said input.

2. A signal inverter comprising a polarity splitter including a transistor amplifier having an unbypassed emitter resistor and a collector resistor; first and second terminal means coupled respectively to the collector and emitter sides of said transistor to provide respectively an inverted and an uninverted replica of an input signal applied to the base of said transistor; switching means connected to said transistor and including a resistor connected in parallel with said collector resistor for varying the gain from said base to said collector depending on the state of a control signal whereby the relative intensity of said inverted and uninverted signals is varied; and means connected to said first and second terminals for combining said inverted and uninverted signals to form an output which is directly proportional to their algebraic sum.

3. A signal inverter circuit as described in claim 2 and wherein said switching means further includes a transistor.

4. A signal inverter comprising a first transistor having emitter, base and collector electrodes; a source of potential; a collector resistor connected between said source of potential and said collector electrode; an emitter resistor connected between said emitter electrode and ground; a second transistor having a grounded emitter electrode, a base electrode and a collector electrode; a collector resistor connected to said collector electrode of said second transistor and coupled to said emitter electrode of said first transistor by a capacitor; a first terminal coupled to said collector electrode of said first transistor by a capacitor; a second terminal connected to said collector electrode of said second transistor by a capacitor; and an adding means coupled to said first and second terminals and comprising an output terminal for providing a signal the voltage of which is directly proportional to the sum of the voltages at said first and second terminals.

5. A device as described in claim 4 and wherein said adding means comprises a first resistor connected between said first terminal and said output terminal; a second resistor connected between said second terminal and said output terminal; and a third resistor connected between said output terminal and ground.

6. A signal inverter comprising a first transistor having emitter, base, and collector electrodes; a source of potential; a collector resistor connected between said source of potential and said collector electrode; an emitter resistor connected between said emitter electrode and ground; an input terminal connected to said base electrode; a first terminal coupled by a first capacitor to said collector electrode; a second terminal coupled by a second capacitor to said emitter electrode; a second transistor connected between said emitter electrode and a collector electrode coupled to said first terminal by a collector resistor; and adding means connected to said first and second terminals and comprising an output terminal for providing a signal the voltage of which is directly proportional to the sum of the voltages at said first and second terminals.

7. A device as described in claim 6 and wherein said adding means comprise a first resistor connected between said first terminal and said third terminal; a second resistor connected between said second terminal and said output terminal; and a third resistor connected between said output terminal and ground.

References Cited by the Examiner
UNITED STATES PATENTS

| | | | |
|---|---|---|---|
| 2,791,642 | 5/1957 | Kobbe | 330—117 X |
| 2,830,133 | 4/1958 | Ranks | 330—73 |
| 2,940,048 | 6/1960 | Kenny | 330—70 X |
| 3,032,704 | 5/1962 | Beck | 330—29 X |
| 3,070,656 | 12/1962 | Wiencek | 330—14 X |
| 3,082,380 | 3/1963 | Herrmann | 330—18 |
| 3,170,120 | 2/1965 | Jensen et al. | 330—117 |

ROY LAKE, *Primary Examiner.*